350-96.15 SR
PM036 XR 3,773,289

[11] 3,773,289
[45] Nov. 20, 1973

[54] PHOTODETECTOR DELAY EQUALIZER

[75] Inventor: Detlef Christoph Gloge, Red Bank, N.J.

[73] Assignee: Bell Telephone Laboratories, Incorporated, Murray Hill, N.J.

[22] Filed: June 20, 1972

[21] Appl. No.: 264,430

[52] U.S. Cl. ..... 250/211 J, 317/235 N, 350/96 WG
[51] Int. Cl. ..... H01l 15/00
[58] Field of Search ..... 250/211 J, 227; 317/235 N; 350/96 WG

[56] References Cited

UNITED STATES PATENTS

| | | | |
|---|---|---|---|
| 3,563,630 | 2/1971 | Anderson et al. | 350/96 WG |
| 3,459,944 | 8/1969 | Triebwasser | 250/211 J |
| 3,400,383 | 9/1968 | Meadows et al. | 250/211 X J |
| 3,423,594 | 1/1969 | Galopin | 250/227 X |

*Primary Examiner*—Walter Stolwein
*Attorney*—W. L. Keefauver

[57] ABSTRACT

This application discloses a new photodetector with built-in delay for the equalization of the delay distortion produced in multimode optical fibers. The device combines the known advantages of photodiodes and semiconductor delay lines in a single, semiconductor platelet.

7 Claims, 4 Drawing Figures

PHOTODETECTOR DELAY EQUALIZER

The invention relates to detector-equalizers for use with multimode optical fibers.

BACKGROUND OF THE INVENTION

Recent advances in the fabrication of ultratransparent materials have demonstrated that fibers are a promising transmission medium for optical communication systems. By using coherent sources and single mode fibers, such systems are theoretically capable of operating at pulse rates of the order of tens of gigahertz.

There are, however, many applications which are preferably optimized with respect to cost and simplicity, rather than speed. Systems of this latter kind would employ incoherent light sources and multimode fibers.

In the copending application by E. A. J. Marcatili, Ser. No. 247,448, filed Apr. 28, 1972, there is described an arrangement for coupling an incoherent signal source to a multimode fiber. As noted therein, one of the problems associated with such systems is the delay distortion resulting from the fact that the various modes propagate with different group velocities. While means are disclosed for minimizing this distortion, it cannot be totally eliminated.

It is accordingly, the broad object of the present invention to minimize the delay distortion produced in multimode optical fibers.

SUMMARY OF THE INVENTION

In accordance with the present invention, the dispersion introduced in multimode optical fibers, due to differences in the group velocities of the various modes, is compensated in a photodetector by controlling the drift times of the carriers generated by the different propagating modes. As is known, the energy radiated from the end of a multimode fiber is concentrated in a plurality of cones, where each mode has a characteristic radiation cone angle. Thus, in a detector-equalizer in accordance with the present invention, a photoresponsive semiconductor is located adjacent to the fiber end in a plane perpendicular to the fiber axis. Each cone of radiation, corresponding to a different mode group, illuminates a ring on the semiconductor, generating electron-hole pairs. A voltage applied between the center and an output terminal at the outer periphery of the detector, causes the holes to drift radially to the output terminal. The time it takes to reach the output terminal is greatest for holes generated by the faster propagating, lower order modes which illuminate the inner regions of the detector, and shortest for holes generated by the slower propagating higher order modes which illuminate the outer regions of the detector. By controlling the electric field intensity across the detector, the drift times can be made to just compensate for the dispersion produced in the fiber.

While the above-described configuration is convenient in that it conforms to the radiation pattern at the output end of the fiber, other structures and different degrees of compensation can be realized. In general, any configuration wherein the carriers generated by the faster modes are made to travel a greater distance than those generated by the slower modes will reduce the delay distortion. The particular shape of the equalization can then be tailored by controlling the electric field variations in the direction of carrier drift. In the specific embodiment described, the electric field varies inversely with distance, and exactly compensates for the differences in mode velocities. However, the invention is not limited thereby.

It is an advantage of the present invention that both detection and delay equalization are obtained in a single semiconductor device.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
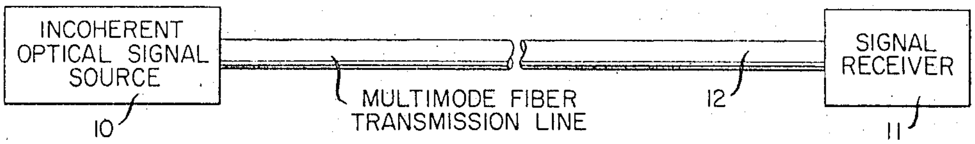
FIG. 1 shows, in block diagram, a multimode, optical communication system.

Referring to the drawings, FIG. 1 shows, in block diagram, an optical communication system comprising an incoherent optical signal source 10, a signal receiver 11, and a multimode fiber transmission line 12 coupling the source to the receiver.

The present invention relates particularly to the output portion of the system and, specifically, to the detector in the receiver. In this regard, reference is now made to FIG. 2 which shows the output end of line 12, comprising a clad optical fiber, and the radiation pattern of the wave energy emitted by the fiber.

Figure 2:
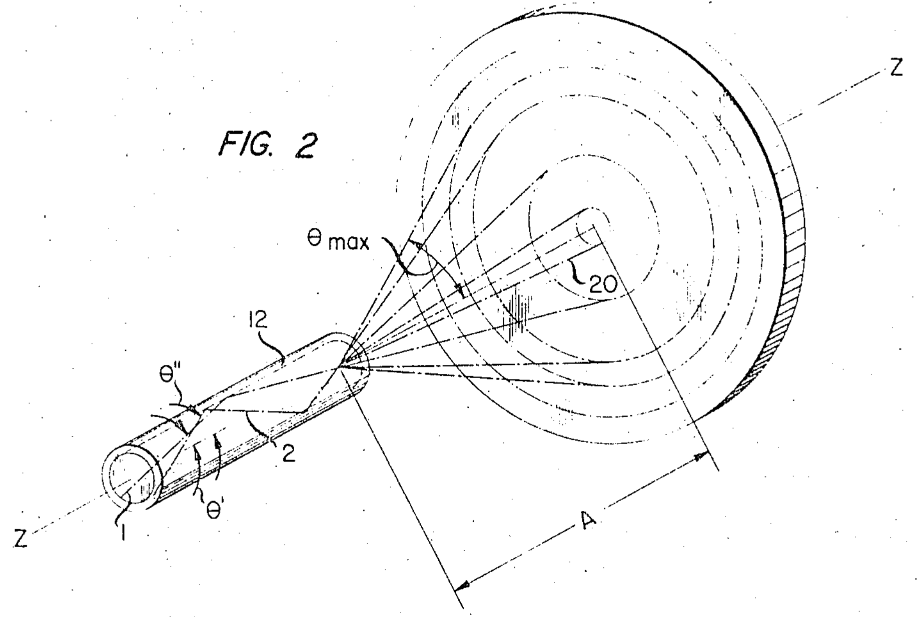
FIG. 2 shows the output end of a multimode optical fiber, and the radiation pattern of the wave energy emitted by the fiber.

As is known, each of the various propagating modes supported by a multimode optical fiber can be represented by a ray progressing along the fiber at a characteristic angle to the fiber axis, as shown in FIG. 2. For purposes of illustration, two rays 1 and 2 are illustrated where a lower order mode ray 1 is shown propagating at an angle $\theta'$ to the fiber axis Z—Z, and ray 2, a higher order mode, is shown directed at a larger angle $\theta''$ to the axis. Both rays are reflected at the core-cladding interface and, hence, are guided. Those higher order modes, whose angles of incidence at the interface are less than critical, tend to radiate out of the fiber and, hence, do not reach the output end of the line.

The radiation field at the end of the fiber is concentrated within the cone formed by the highest order propagating mode. This maximum cone angle, $\theta_{max}$, is given by $$\theta_{max} = (2n\cdot\Delta n)^{1/2} \tag{1}$$

where $n$ is the refractive index of the fiber core; and $\Delta n$ is the difference between the refractive indices of the core and cladding. Typically, $\Delta n$ is less than 0.1. Since the core radius is of the order of tens of $\mu$m, far-field conditions are established at about a millimeter from the fiber end. The far-field radiation of the fastest mode (i.e., the lowest order mode,) is in a very narrow cone 20 along the fiber axis Z—Z. Each of the slower propagating modes, (i.e., the higher order modes) shows little radiation along the axis, but produces a radiation maximum at a different angle $\theta$ with the axis. The relative delay, $\tau$between any of the higher order modes and the fastest mode is given by $$\tau = L/c \cdot 1/2n\ \theta^2 \qquad (2)$$

where $L$ is the line length;

$c$ is the vacuum velocity of light;

and $\theta$ is the radiation angle of the particular mode.

Hence, a mode with a delay $\tau$, illuminates a ring with a radius $$r = \theta A \qquad (3)$$

where $A$ is the distance between the end of the fiber and a plane perpendicular to the fiber axis.

Figures 3, 4:
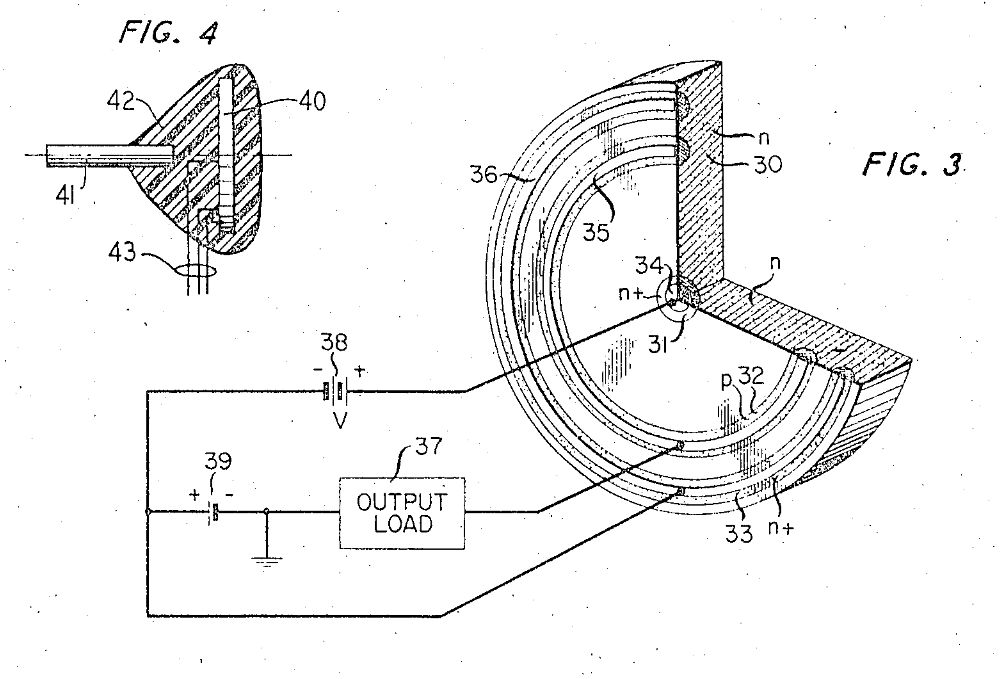
FIG. 3 shows a detector-equalizer in accordance with the present invention.
FIG. 4 shows a detector-equalizer bonded to a segment of optical fiber.

In a detector-equalizer, in accordance with the present invention, the drift time of the carriers produced in a photoresponsive material by the above-described radiation pattern is used to equalize the mode delay. FIG. 3, now to be considered, shows such a detector-equalizer comprising a platelet 30 of an $n$-type, photoresponsive semiconductor material having a strongly $n^+$ doped region 31 at its center, and two ring-shaped concentric regions 32 and 33 at its outer periphery. The outermost ring 33 is also $n^+$ doped, while the inner ring 32 is $p$ doped. Suitable metallic contacts, 34, 35 and 36, bonded to the three regions 31, 32 and 33, respectively, connect the detector to an output load 37. Specifically region 31 is connected to one end of output load 37 through the series-connected direct-current power supplies 38 and 39. The other end of output load 37 is connected to the $p$-region 32. Region 33 is connected to the junction of power supplies 38 and 39. While ring 32 is somewhat smaller than ring 33, for purposes of the following calculations both are assumed to be equal and, in particular, to have a radius $$R = \theta_{max} A\ . \qquad 4)$$

In the absence of any incident light, the voltage V, applied between the $n^+$ regions 31 and 33, causes a current to flow therebetween which is a function of the ohmic impedance of platelet 30. The p-n junction, formed by $p$-region 32 and the platelet, on the other hand, is back-biased so that no current flows through load 37.

Upon exposure to light, electron-hole pairs are generated within the detector. The holes, under the influence of the applied field, drift outwardly in a radial direction, and are collected in the $p$ region, producing a current in the output load. The electrons are collected at the center of the detector and cause an increase in the current circulating between the two $n^+$ regions. The electron current does not flow through the output load. Thus, regions 31, 30 and 32 can be considered to be a reverse-biased $n^+ - n - p$ junction which produces the useful photocurrent.

The circular arrangement described hereinabove results in a radially directed field $E(r)$ which decreases as a function of the radius 4. In particular, $$E(r) = R/r\ E_R \qquad (5)$$

where $E_R$ is the field at the $p$ region. The hole velocity is the product of $E(r)$ from equation (5) and the hole mobility $\mu_p$. A hole generated at $r$ therefore drifts radially outward with a velocity $\mu_p E(r)$ and requires a time $$\tau_p = \int_r^R \frac{d\rho}{\mu_p E(\rho)} \qquad (6)$$

to reach the electrode 32 at $R$. After substituting for $E(r)$ from equation (5) and integrating, we obtain $$\tau_p = R^2 - r^2/2\ \mu_p E_R\ . \qquad (7)$$

We also know, from equations (2) and (3), that the mode delay for a mode incident at radius $r$ is $$\tau = (L/2nc)\ (r^2/A^2)\ . \qquad (8)$$

For perfect equalization, the sum of the carrier drift time (7) and the mode delay (8) must be the same for all modes and, hence, independent of $r$. The 4-dependent terms in the sum $\tau_p + \tau$ cancel if $$E_R = (nc/\mu_p)\ (A^2/LR)\ . \qquad (9)$$

In order to develop the proper velocities for the holes in the center region, very large fields and potentials would be required. To avoid too large a bias voltage, the radius $b$ of center region 31 is made such that the center field and the center potential are within reasonable limits and, at the same time, the loss of holes in the blind area within $b$ is tolerable. (It should be noted, in this regard, that recombination would tend to prevent most of the holes generated at the very center from reaching the circumference by diffusion.)

Integration of $E(r)$ yields, for the applied bias required between $b$ and $R$, $$V = -\tfrac{1}{2}\ E_R R\ \ln(1-\eta)\ , \qquad (10)$$

where $$\eta = 1 - b^2/R^2\ . \qquad (11)$$

With the mode delay corrected by the drift detector, there are still three lesser sources of delay distortion left. These include: (1) the material dispersion of the fiber core as a function of frequency, which introduces delays of up to 10 ns in 2.5 km of fiber, if a luminescent diode is the carrier source; (2) the angular spread of the far-field radiation of a certain mode around the exact angle $\theta$. This results in a temporal spread of the carriers generated by this mode in the detector; and (3) diffusion of the carriers as they drift toward the $p$-region. The total delay distortion due to these three combined effects is about one order of magnitude less than the delay distortion produced by the differences in the group velocities of the guided modes. Thus, significant improvement can be realized in accordance with the present invention.

EXAMPLE

The following numerical example illustrates one particular design of a detector-equalizer for use in a multimode system using a luminescent diode as transmitter. Assuming:

fiber length $L = 2.5$ km
core radius $a = 25\ \mu$m
maximum angle $\theta_{max} = 0.4$ rad
core index $n = 1.5$
detector radius $R = 2$ mm
hole mobility $\mu_p = 440$ cm²/Vs
blind spot radius $b = 0.4$ mm Substituting $\theta_{max}$ in equation (2), we obtain a total (uncorrected) mode delay of $$\tau = 515 \text{ ns.}$$

From equation (4) we obtain, for the distance between the fiber end and the detector, $$A = 5 \text{ mm.}$$

Equation (9) determines the field strength at the periphery $$E_R = 510 \text{ V/cm}.$$

With $b = 0.4$ mm we have $$\eta = 0.96$$

and, from equation (10), $$V = 165 \text{ volts.}$$

With respect to specific materials, silicon, doped with appropriate amounts of phosphorous, can be used to produce the $n$ and $n^+$ regions. The $p$-region can be formed by alloyed aluminum. With a donor concentration sufficient to produce a resistance of 200 Ω/cm in the $n$-region, a current of about 15 mA will flow between the two $n^+$-regions. In addition to the drift voltage V, a bias is also required between regions 32 and 33. This bias can be of the same order as V if the $p$-region is designed to produce avalanche multiplication.

It will be recognized that the most efficient operation of a photodetector-equalizer of the type described is obtained when the latter is centered along the fiber axis and lies in a plane that is perpendicular to the fiber axis, and is spaced a distance A from the fiber end, where A is as given in equation (4). The appropriate location and orientation is conveniently realized by illuminating the fiber by means of a pulsed incoherent source, and then varying the position of the detector relative to the fiber end until the narrowest output pulse is obtained. The detector and fiber are then bonded together to form a permanent connection. This procedure can be performed in the field, in which case the detector is connected directly to the end of a service fiber. Alternatively, the aligning and bonding procedure can be performed at the factory, in which case the detector is connected to a small segment of fiber. The latter arrangement is illustrated in FIG. 4 which shows a detector 40 and a short segment of fiber 41 bonded together by means of a potting material 42. Leads 43 permit connecting the appropriate biasing sources and output load to the detector. In the field, the fiber segment 41 is then spliced to the terminal end of a service fiber. This can be done, for example, in the manner described in the copending application of R. F. Trambarulo, Ser. No. 239,034, filed Mar. 20, 1972 or of F. A. Braun et al., Ser. No. 227,908, filed Feb. 22, 1972, both of which are assigned to applicant's assignee.

To exclude ambient light, the detector is advantageously placed in a lightproof enclosure when in operation. Because of their small size, and the large numbers in which such devices will be used, a common enclosure to house the terminal end of an optical fiber cable would appear to be preferable over a separate lightproof enclosure for each of the individual detectors.

It is apparent that the above-described arrangements and materials are illustrative of but some of the many possible specific embodiments which can represent applications of the principles of the present invention. As indicated hereinabove, other detector configurations can be employed, and different degrees of equalization realized by controlling the field distribution along the direction of carrier drift. Thus, numerous and varied other arrangements can readily be devised in accordance with these principles by those skilled in the art without departing from the spirit and scope of the invention.

What is claimed is:

1. A photodetector adapted to compensate for the delay distortion in a multimode optical fiber comprising:

means, including a photoresponsive semiconductor material of a first conductivity type, for generating electron carrier-hole carrier pairs in response to a beam of incident radiation;

a collecting region of opposite conductivity type disposed along a portion of said material;

and separate means for causing one of the two types of said generated carriers to drift towards said collecting region wherein the drift time for said one type carrier generated by the faster propagating modes travel a greater distance than the carriers generated by the slower propagating modes.

2. The photodetector according to claim 1 wherein said semiconductor material is $n$-type material;

and wherein said carriers are hole-carriers.

3. The photodetector according to claim 1 wherein said means for causing the carriers of said one type to drift produces an electric field whose intensity varies inversely with distance.

4. A detector-equalizer comprising:

a platelet of an $n$-type photoresponsive semiconductor material including:

a region of $n^+$-type conductivity defining the center of said detector-equalizer;

a first circular region of $p$-type conductivity concentric with said center;

and a second, larger circular region of $n^+$-type conductivity concentric with said center.

5. The detector-equalizer according to claim 4 including:

means for back-biasing said $p$-type region relative to said $n^+$-type regions;

and an output load connected to said $p$-type region.

6. The detector-equalizer according to claim 4 including:

a segment of optical fiber bonded thereto.

7. The photodetector according to claim 1 including an output load connected to said collecting region.

* * * * *